United States Patent [19]

Clark et al.

[11] Patent Number: 4,539,183
[45] Date of Patent: Sep. 3, 1985

[54] DISTRIBUTION GRID SUPPORT STRUCTURE

[75] Inventors: Malcolm W. Clark, Upper Montclair; Harold B. Kohn, Cedar Grove, both of N.J.

[73] Assignee: The Lummus Company, Bloomfield, N.J.

[21] Appl. No.: 494,169

[22] Filed: May 13, 1983

[51] Int. Cl.³ .............................. B01J 8/44; B01J 8/24
[52] U.S. Cl. .................................... 422/143; 34/57 A; 422/241; 422/311; 431/7; 431/170; 432/15; 432/58
[58] Field of Search ............... 422/143, 311, 241; 34/57 A; 431/7, 170; 432/15, 58

[56] References Cited

U.S. PATENT DOCUMENTS

| | | | |
|---|---|---|---|
| 2,595,384 | 5/1952 | Johnsen et al. | 422/143 X |
| 2,647,738 | 8/1953 | Trainer | 422/143 X |
| 2,836,902 | 6/1958 | North | 422/143 X |
| 3,231,338 | 1/1966 | Andrus | 422/241 |
| 3,462,246 | 8/1969 | Copeland | 422/143 |

Primary Examiner—Hiram H. Bernstein
Assistant Examiner—William R. Johnson
Attorney, Agent, or Firm—Carella, Byrne, Bain & Gilfillan

[57] ABSTRACT

A support structure for a distribution grid to be mounted in a reaction vessel wherein the reaction vessel is formed with an inwardly-extending annular shoulder portion to which is mounted, such as by welding, a ring-member whereby the distribution grid is mounted on such support structure.

8 Claims, 2 Drawing Figures

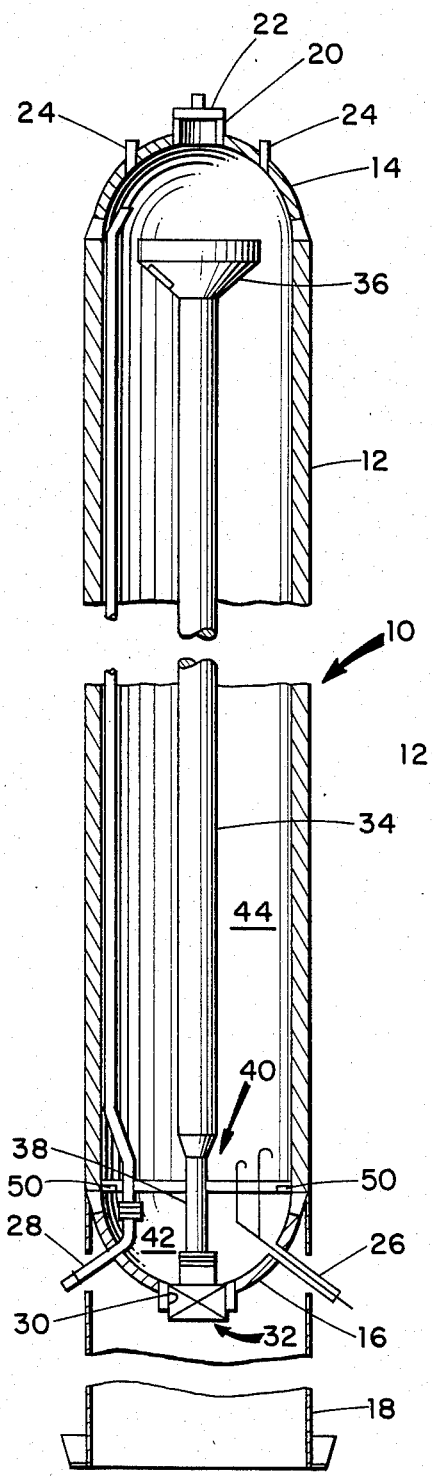
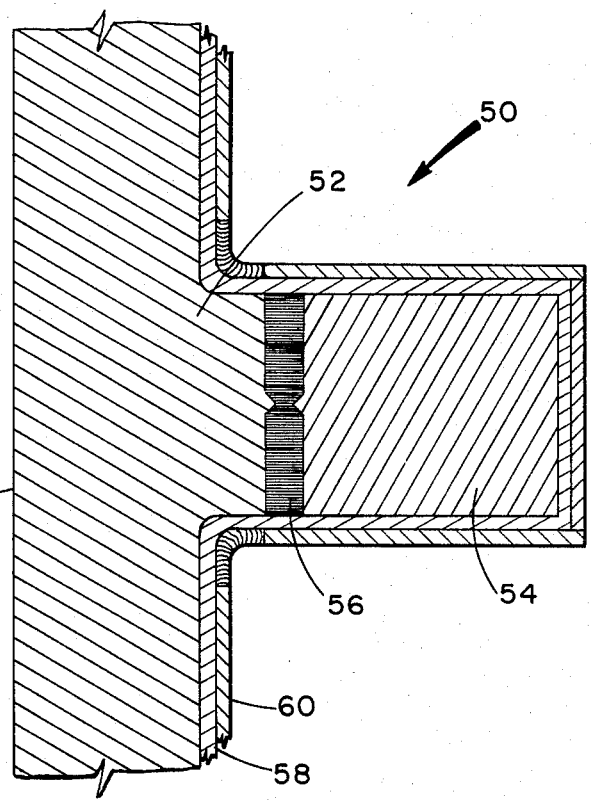
Fig. 1
Fig. 2

DISTRIBUTION GRID SUPPORT STRUCTURE

FIELD OF THE INVENTION

This invention relates to high pressure reaction vessels, and more particularly to a flow distributor support structure for high pressure reaction vessels.

BACKGROUND OF THE INVENTION

In U.S. Pat. No. 2,987,465 to Johnson, there is disclosed a reaction system between liquids, solids and gases in a so-called "ebullated bed" in a reaction vessel in which gases and liquids flow upwardly through a reaction zone under conditions which tend to place the contact particles in random motion. It has been found that nearly isothermal conditions result when the catalyst or contact bed is expanded at least 10%, and generally not more than 300%. It is also found that the random motion of the particles in the liquid avoids attrition and permits such control that substantially no solids are carried out of the reaction zone. In each ebullated system, variables which may be adjusted to attain the desired ebullation (random motion of the particles in the liquid) include the flow rate, density and viscosity of the liquid and the gasiform material, and the size, shape and density of the particulate material.

The ebullated bed effect is accomplished by a distributor grid extending laterally within the reaction vessel provided with a plurality of distribution devices, such as bubble caps, and positioned within the reaction vessel by a support ring internally welded to the interior surface of the reaction vessel. With the materials of construction, particularly of the interior surface of the reaction vessel, e.g. low alloy carbon steel covered by stainless steel, weld failure often occurred at the weld or beneath the weld, which failure was difficult to detect and resulted in reduced reaction efficacy.

OBJECTS OF THE INVENTION

An object of the present invention is to provide an improved support structure for a distributor grid of a reaction vessel.

Another object of the present invention is to provide an improved distributor support grid structure integrally formed within the reaction vessel.

Still another object of the present invention is to provide an improved distributor support grid structure of improved strength.

Yet another object of the present invention is to provide an improved distribution support grid structure of reduced thermal stresses.

A further object of the present invention is to provide a weld attachment readily examined by conventional radiographic techniques.

SUMMARY OF THE INVENTION

These and other objects of the present invention are achieved by a support structure for a distribution grid to be mounted in a reaction vessel wherein the reaction vessel is formed with an inwardly-extending annular shoulder portion to which is mounted, such as by welding, a ring-member whereby the distribution grid is mounted on such support structure.

BRIEF DESCRIPTION OF THE DRAWING

A better understanding of the present invention as well as other objects and advantages thereof, will become apparent upon consideration of the detailed disclosure thereof, especially when taken with the accompany drawing, wherein:

FIG. 1 is a schematic elevational view of a reaction vessel employing the distribution support grid structure of the present invention; and FIG 2 is an enlarged partial cross-sectional view of the support structure.

DETAILED DESCRIPTION OF THE INVENTION

Referring now to FIG. 1, there is illustrated a reaction vessel, generally indicated as 10, of the type for effecting high pressure reactions in an ebullated bed. The reaction vessel 10 is comprised of a cylindrically-shaped side wall 12 enclosed by a hemispherically-shaped top head 14 and a hemispherically shaped bottom head 16 mounted on a cylindrically-shaped skirt member 18.

The reaction vessel 10 is a thick-walled vessel adapted for a liquid-solids-gaseous contact, as for example, the hydrogenation of hydrocarbons in the presence of catalyst in which the pressures are usually in the range of 1000 to 5000 p.s.i.g., and in which the temperatures are usually in the range of 750°-850° F. It will be understood, however, that the following invention is adapted to many forms of liquid-solids- gaseous contact processes in which the temperatures and pressures and contact particles may have very wide ranges.

The top head 14 of the reaction vessel 10 is provided with a manhole opening 20 enclosed by a manhole cover 22, a solids inlet 21, and a plurality of conduits (one shown) 24 for positioning a plurality of thermowells (not shown). The bottom head 16 is provided with a feed inlet conduit 26, a reaction effluent outlet conduit 28 and a centrally-disposed opening 30 for a recycle pump assembly, generally indicated as 32.

Coaxially-disposed within the reaction vessel 10, there is provided an elongated down-comer tube 34 including a conically-shaped upper portion 36 and a lower recycle distribution conduit assembly 38. In a lower portion of the reaction vessel 10 there is transversely mounted a disc-shaped distribution grid assembly, generally indicated as 40, as more fully hereinafter discussed. The disc-shaped distribution grid assembly 40 includes fluid-gaseous mixing devices (not shown), such as bubble cap assemblies, such as described in U.S. Pat. No. 3,475,134 to Weber et al. The distribution grid assembly 40 divides the reaction vessel 10 into a lower plenum chamber 42 and an upper chamber 44 primarily functioning as the reaction zone.

Referring now to FIG. 2, there is illustrated the distribution grid support structure of the present invention, generally indicated as 50, for mounting disc-shaped distribution grid assembly 40. The distribution grid support structure 50 is comprised of an inwardly-extending annular ring portion 52 integrally formed with the sidewall 12 of the reaction vessel 10 to which annular ring portion 52 there is mounted, such as by welding, a support ring member 54. The support ring member 54 may be mounted by providing a plurality of weld deposits 56, or alternatively, by directly welding the support ring 54 to the annular portion 52. Preferably the support ring 54 is formed of like material of construction as that constituting the reaction vessel 10 thereby reducing thermal stresses.

Once the support ring 54 is mounted on the support annular ring portion 52, a first layer of stainless steel 58 is deposited as a continuous layer over the interior surface of the reaction vessel 10. Preferably thereafter, a second layer of stainless steel 60 is deposited over the first layer 58 at the juncture of the annular ring portion. 52 and the reaction vessel 10. In this manner, any bonding between stainless steel layers and the reaction vessel 10 does not structurally affect the inwardly extending annular ring portion 52 for the support ring 54.

While the invention has been described in connection with a preferred embodiment thereof, it will be understood that many modifications will be apparent to those or ordinary skill in the art; and that this application is intended to cover any adaptation or variation thereof. Therefore, it is manifestly intended that the invention be only limited by the claims and the equivalents thereof.

What is claimed:

1. In a reaction vessel having an interior surface and a distribution grid separating the vessel into a lower plenum chamber and an upper reaction zone, wherein the improvement comprises a support structure for said distribution grid comprising an inwardly-extending annular ring portion integrally formed with said reaction vessel, and a disc-shaped ring member attached to said annular ring portion, wherein said disc-shaped ring member and said interior surface of said reaction vessel including said annular ring portion have a layer of a metallic material coated thereon.

2. The reaction vessel as defined in claim 1 wherein said ring member is welded to said annular ring portion.

3. The reaction vessel as defined in claim 1 wherein said ring member is formed of the same metallic-material as said reaction vessel.

4. The reaction vessel as defined in claim 1 wherein said metallic-material coated on said ring member and said interior surface including said annular ring portion is stainless steel.

5. The reaction vessel as defined in claim 4 wherein the improvement further comprises a second layer of stainless steel on said first layer of stainless steel at the junction of the annular ring portion and said reaction vessel.

6. The reaction vessel as defined in claim 1, 2, 3, 4, or 5 wherein said ring member is coplanar with respect to said ring portion.

7. The reaction vessel as defined in claim 1, 3, 4, or 5 wherein the improvement further comprises a plurality of weld deposits provided on said ring portion for attaching said ring member.

8. The reaction vessel as defined in claim 7 wherein said ring member is coplanar with respect to said ring portion.

* * * * *